United States Patent [19]

Rude

[11] 4,165,656
[45] Aug. 28, 1979

[54] MULTI-MODE RATCHET INDEXER
[75] Inventor: Edward T. Rude, Columbia, Md.
[73] Assignee: MRC Corporation, Hunt Valley, Md.
[21] Appl. No.: 818,240
[22] Filed: Jul. 22, 1977
[51] Int. Cl.² .............................................. F16H 27/02
[52] U.S. Cl. ......................................... 74/129; 74/143
[58] Field of Search ................. 74/129, 143, 128, 150, 74/151, 152, 153, 154, 157, 158

[56] References Cited

U.S. PATENT DOCUMENTS

| | | | |
|---|---|---|---|
| 1,126,084 | 1/1915 | Beisbach | 74/151 |
| 3,138,030 | 6/1964 | Godel | 74/159 |
| 3,408,879 | 11/1968 | Modder et al. | 74/129 |
| 3,475,981 | 11/1969 | Gerard | 74/143 |
| 3,802,282 | 4/1974 | Cook | 74/128 |

*Primary Examiner*—Samuel Scott
*Assistant Examiner*—Wesley S. Ratliff, Jr.
*Attorney, Agent, or Firm*—LeBlanc & Shur

[57] ABSTRACT

A multi-mode indexer having a gear wheel rotatably mounted on a base; a drive bracket assembly is rotatably mounted coaxially with the wheel shaft for reciprocal movement relative to the shaft. A first pair of oppositely disposed pawls are mounted to the drive brackets to engage and drive the gear wheel during the drive stroke. (One pawl driving while the other prevents overtravel). A second pair of oppositely disposed pawls are mounted to the base to provide a positive stop action against further rotation of the gear wheel at the end of each drive cycle and to lock the gear wheel in position during recovery of the drive bracket so that the gear wheel is at all times either locked in a stationary position or positively locked to the motion of the drive bracket. Cam members are rotatably mounted on the gear wheel shaft to control the action of selected pawls and thus control the CW or CCW indexing of the gear wheel as a function of the position of each cam member.

12 Claims, 6 Drawing Figures

MULTI-MODE RATCHET INDEXER

BACKGROUND OF THE INVENTION

This invention relates to an indexing mechanism, and particularly, an indexer having full control of the load during load advance and dwell phases and having a multi-mode capability.

Automatic assembly operations typically require a mechanism for moving workpieces step-by-step through various processing stages. This transfer function can be accomplished by means of an indexing mechanism which can translate a continuous motion into an intermittent movement. For example, in an automated package filling system, where containers to be filled are placed on a conveyor and passed under a stationary filling station, it is desired to stop the conveyor long enough to fill a container and then index the conveyor one position to shift the filled container out of the filling station and the next empty container into the filling station.

It is also desirable to be able to reverse the direction of conveyor movement, to oscillate the conveyor (e.g., to pack materials on the conveyor closer together or to sift them), or to lock the conveyor against movement, all without changing the master drive, which may also be driving other phases of the assembly operation.

Heretofore, the prior art has used ratchet indexers which permit intermittent motion in only one direction; any change in the operational mode comes from a change in the operation of the master drive, or cam controlled indexers. The disadvantage of cam indexers is that they are driven by rotary motion and thus the cyclic period cannot conveniently be varied. In this invention, the indexer is driven by a reciprocal motion which can be triggered when desired. It thus has the advantage of being capable of pnuematic operation. This feature has the benefit of complete control of cycle time and further avoids electric power which is often troublesome in explosive environments. Some prior art indexers also include a neutral position in which no movement is imparted to the indexer by the master drive. Examples of some prior art indexers are found in "In Line Indexing Ideas for Assembly Operations", AUTOMATION, October, 1974, pp. 56–59; other prior art examples are noted in U.S. Pat. Nos. 100,942, issued Nov. 15, 1870 to H. D. Snow; 303,140, issued Aug. 5, 1884 to G. P. Fenner; 1,094,627, issued Apr. 28, 1914 to J. S. Bancroft, et al.; 1,383,331, issued July 5, 1921 to E. Nordstrom; 1,940,230, issued Dec. 19, 1933 to M. B. Richter; 2,711,121, issued June 21, 1955 to A. Barsam; and 3,191,448, issued June 29, 1965 to G. R. Murphy.

The prior art indexers do not permit the full range of operations desired for today's sophisticated automated assembly systems. The present invention is designed to overcome prior art disadvantages and to provide a ratchet indexer which is capable of four modes of operation, including: (1) forward mode; (2) reverse mode; (3) oscillatory mode; and (4) locked or neutral mode. The present invention accomplishes this without requiring any modifications to the master drive, which is permitted to operate continuously in all indexer modes.

Moreover, the present invention incorporates full control of the load during load advance and during dwell (some of the prior art devices control the load during advance and some during dwell, but none known to this inventor accomplish both without the incorporation of a separately controlled locking device during dwell).

It is an object of the present invention to provide an improved ratchet indexer capable of multi-mode operation.

It is a further object of the invention to provide multi-mode capability without altering the operation of the master indexer drive.

It is a further object of the invention to provide an improved indexer having positive control of the load in all modes of operation, including the dwell phase of each mode.

The indexing mechanism of this invention essentially includes a gear wheel rotatably mounted to a base member; drive means, including a pair of reciprocable pawls engageable with the gear wheel and mounted on drive brackets which drive the pair of pawls in a reciprocating motion; positive hold means, including a pair of stationarily mounted pawls mounted to the base member and engageable with the gear wheel to prevent reverse movement of the gear wheel during the recovery cycle of the drive means; and means for positively disengaging one of the pair of reciprocable pawls from the gear wheel at the start of the recovery cycle of the drive means and for re-engaging that pawl with the gear wheel at the termination of the recovery cycle of the drive means.

The indexing mechanism of the invention further includes first and second cam members mounted on the gear wheel shaft for independent rotational movement, and mode selection means coupled to the first and second cam members for independently and selectively moving each cam member between respective first and second positions. In its first position, the first cam member controls movement of one base mounted pawl relative to the gear wheel and, in its second position, the first cam member controls movement of one reciprocable pawl relative to the gear wheel. In its first position, the second cam member controls movement of the other reciprocable pawl relative to the gear wheel and, in its second position, the second cam member controls movement of the other base mounted pawl relative to the gear wheel. When the first and second cam members are each in their respective first positions, the gear wheel is capable of being intermittently driven by the drive means only in a first (forward) rotational direction, and when the first and second cam members are each in their respective second positions, the gear wheel is capable of being intermittently driven by the drive means only in a second (reverse) rotational direction opposite the first rotational direction. In addition, when the first cam member is in its first position and the second cam member is in its second position, the gear wheel is capable only of oscillatory movement in the first and second rotational directions; finally, when the first cam member is in its second position and the second cam member is in its first position, the gear wheel is locked against movement in either of the first and second rotational directions, while the input is free to oscillate.

Further objects and advantages of this invention will become clear from the following description of the preferred embodiments.

DESCRIPTION OF THE PREFERRED EMBODIMENTS

Figure 1:
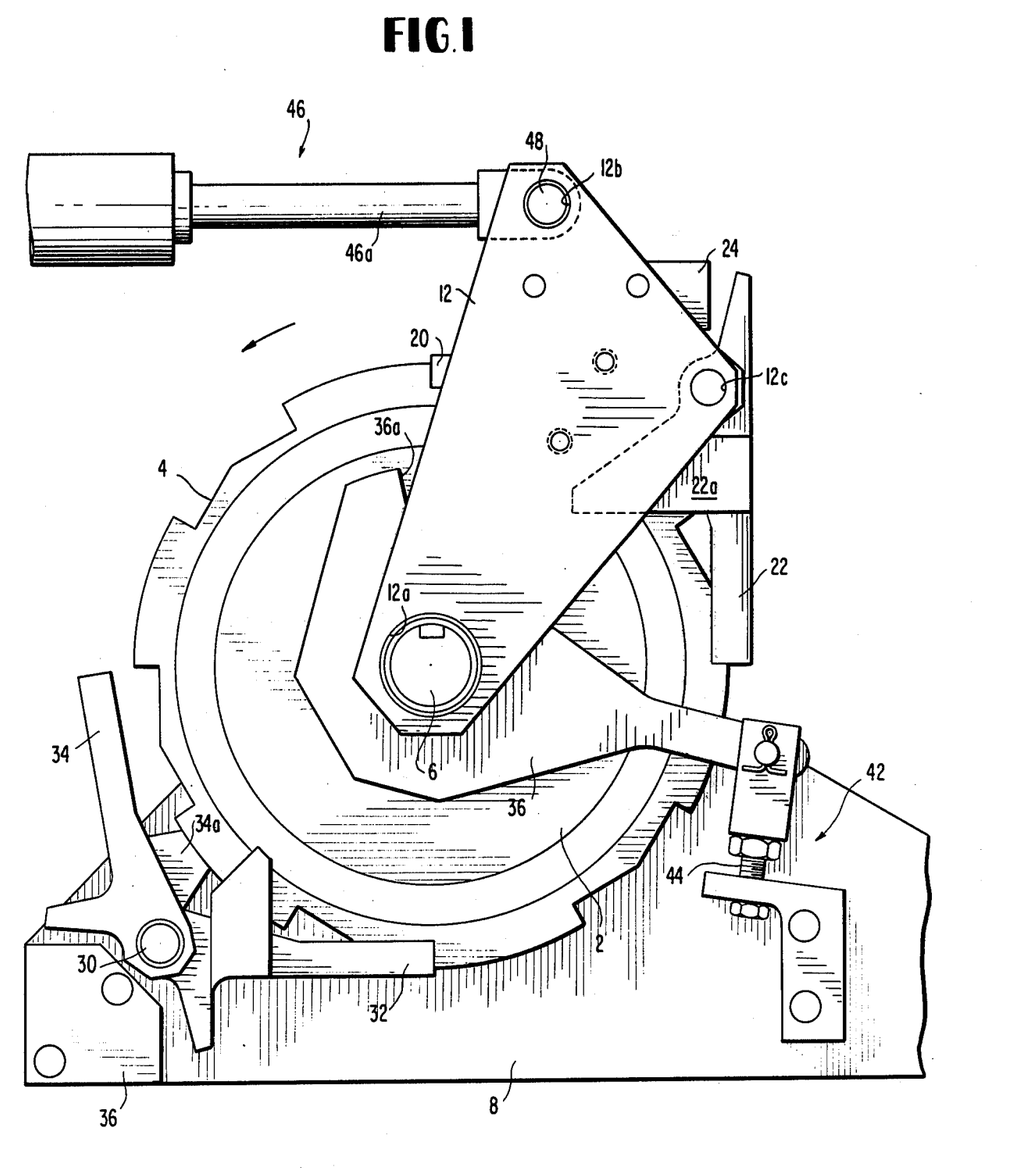
FIGS. 1 and 2 show opposite side sections of a first embodiment of the ratchet indexer.
Figure 2:
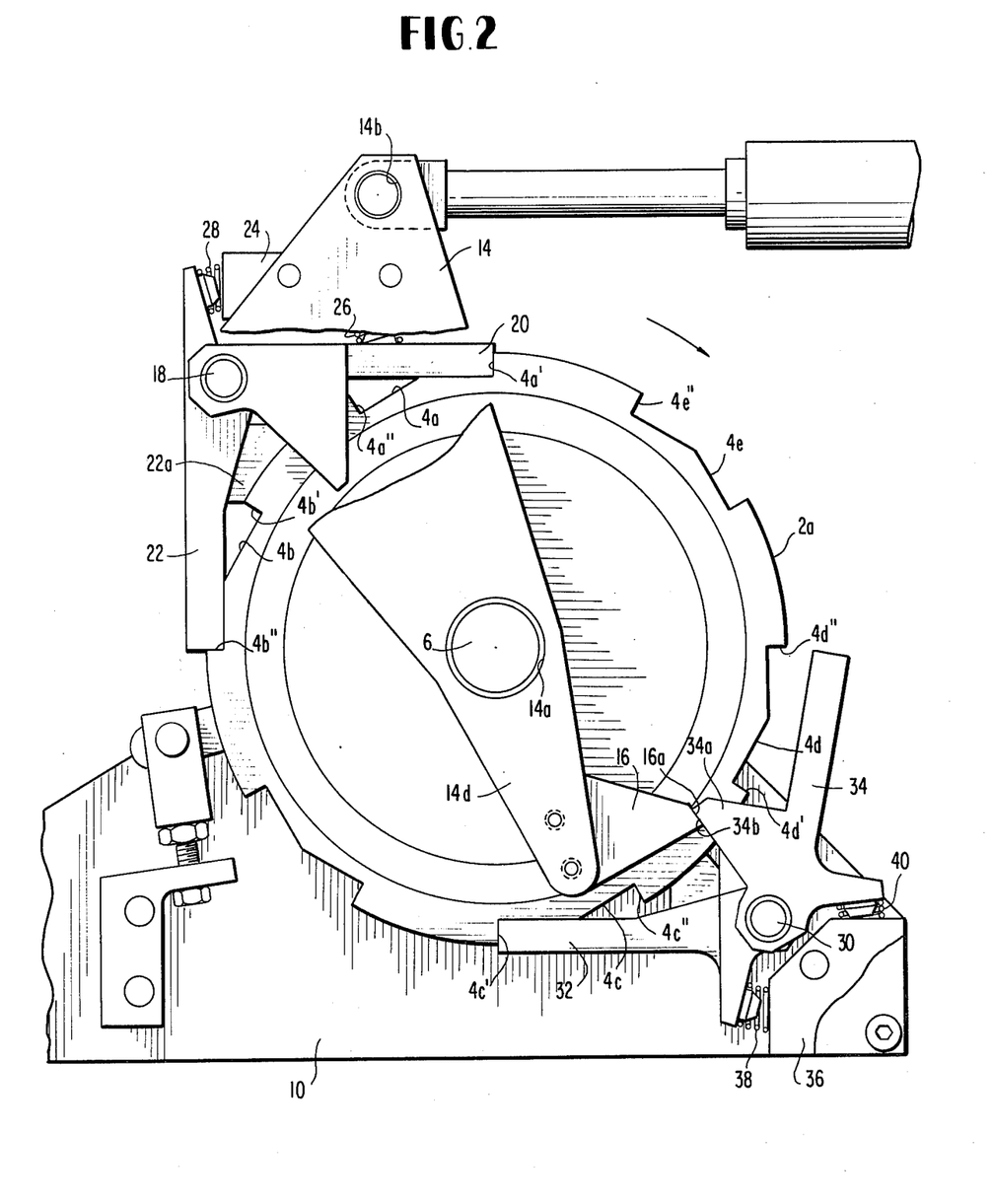

FIGS. 1 and 2 show a first embodiment of the ratchet indexer which provides for movement in only one direction.

A gear wheel 2 has a plurality of notches or grooves, generally designated 4, spaced around its circumference. The grooves 4 may be equally spaced around the circumference of the gear wheel 2; the disclosed embodiment employs six grooves 4a–4f spaced about 60° apart. The number and spacing of the grooves determines the amount of rotation of the gear wheel during each indexing cycle. Gear wheel 2 is fixedly mounted on a shaft 6 for rotational movement therewith. The shaft 6 passes through and is supported by a pair of base plates 8 and 10, shaft 6 being rotatable relative to the supporting base plates.

A pair of bracket members 12 and 14 are respectively rotatably mounted on shaft 6, one on each side of wheel 2. Brackets 12 and 14 are spaced from gear wheel 2 and are movable independently of the gear wheel. Brackets 12 and 14 may be considered as the drive means of the indexer; they reciprocate along an arcuate path through alternating power and recovery strokes. Bracket 12 may have a roughly triangular shape with a large opening 12a at one apex, the diameter of which is slightly greater than the diameter of shaft 6 and in which shaft 6 is received. Bracket 12 has two other holes 12b and 12c extending therethrough at the other corners of the bracket, as shown in FIG. 1. The purpose of openings 12b and 12c will be made clear below.

Bracket 14 also has a relatively large diameter opening 14a (similar to opening 12a in bracket 12) through which shaft 6 passes. Bracket 14 also has an additional pair of through holes (only one of which, 14b, is shown in FIG. 2). Opening 14b aligns with opening 12b and opening 14c (not shown) aligns with opening 12c.

Bracket 14 has an arm 14d which extends in a substantially radial direction from shaft support opening 14a. Fixed to the terminal portion of arm 14d is a cam member 16.

Brackets 12 and 14 are bolted together, or otherwise rigidly secured, for reciprocating rotational motion together about shaft 6. One such bolt securing the brackets 12 and 14 through aligned openings 12c and 14c comprises a shaft 18 on which are pivotably mounted first and second oppositely disposed pawls 20 and 22. Rigidly secured between and to brackets 12 and 14 is a block 24 which provides reaction surfaces for a coil spring 26 loading pawl 20 and a coil spring 28 loading pawl 22.

Pawls 20 and 22 are normally biased into engagement with gear wheel 2, and, in the position shown in the drawing, with adjacent wheel grooves 4a and 4b, respectively.

Base members 8 and 10 are rigidly secured to each other by bolts or other well known means. One such bolt comprises a shaft 30 on which are rotatably mounted third and fourth opposed pawls 32 and 34. Rigidly secured to and between base plates 8 and 10 is a block 36 which provides reaction surfaces for coil springs 38 and 40 that normally bias pawls 32 and 34 into respective engagement with gear wheel 2, and, in the position shown in the drawing, with adjacent grooves 4c and 4d. Pawl 34 includes a leg 34a having a cam surface 34b which is engageable with the end face 16a of cam member 16. Pawl 22 has an arm 22a, the end surface of which is engageable with a cam surface 36a of cam member 36.

A further cam member 36 is mounted on and supported by shaft 6 in such a way that the shaft is freely rotatable relative to the cam member 36. This cam member in turn is fixed to and between base plates 8 and 10 by a bracket arrangement, generally designated 42. The bracket arrangement 42 includes an adjusting screw 44 which permits a certain amount of angular adjustment of the cam member 36.

The external or master drive for the ratchet indexer may comprise a reciprocating piston assembly 46. The piston arm 46a of piston assembly 46 is coupled to the shaft of a bolt 48 securing bracket members 12 and 14 together through openings 12b and 14b, respectively. Brackets 12 and 14 translate the axial reciprocal motion of piston 46a into a rotational reciprocal motion about the axis of shaft 6 to provide the driving force to drive gear wheel 2.

The operation of the ratchet indexer of this embodiment will now be described.

The indexer permits movement in the direction shown by the arrows and advances the load (i.e. rotates wheel 2 and shaft 6) a predetermined amount during each power stroke, depending on the number and spacing of grooves 4. In the disclosed embodiment, this results in a gear wheel rotation of 60° per index.

In FIGS. 1 and 2, the indexer is shown just prior to beginning its power stroke. In this extreme end position, cam leg 16 engages cam leg 34a of pawl 34 to rotate pawl 34 about the shaft 30 opposite the force of bias spring 40 and out of engagement with groove 4d of wheel 2 (in the clockwise direction in FIG. 2). Pawls 20 and 22 are spring loaded against wheel 2, as shown. As piston arm 46a retracts, it causes brackets 12 and 14, and pawls 20 and 22, to rotate in the direction of the arrows. Pawl 20 acts against end wall 4a' of gear wheel 2 to rotate the wheel during the power stroke. Movement of the brackets 12 and 14, pawls 20 and 22, and gear wheel 2 all occur about the same axis of rotation, conincident with the axis of shaft 6. As bracket 14 is rotated, it releases pawl 34, which is urged (counterclockwise in FIG. 2) back into engagement with wheel 2 by spring 40. The tolerances of the system are such that by the time pawl 34 engages wheel 2, groove 4d has rotated so that pawl 34 will not fall back into groove 4d but will ride on the outer surface 2a of the wheel.

At the end of the power stroke, wheel 2 has rotated 60°; pawl 34 drops into groove 4e and engages end wall 4e" to stop further rotation of the gear wheel. This prevents overshoot which might otherwise occur due to system inertia. Also, as the end of the power stroke is reached, pawl arm 22a engages cam surface 36a of cam member 36 to cause pawl 22 to rotate about shaft 18 against the action of spring 28 (counterclockwise in FIG. 1). This causes disengagement of pawl 22 from wheel 2 to permit the drive piston assembly 46 to rotate the brackets 12 and 14 and pawls 20 and 22 in the direction opposite the arrows to thereby return these brackets and pawls to their initial position (as shown) during the recovery stroke. Reverse rotation of wheel 2 is prevented by the engagement of pawl 32 with end wall 4d' of groove 4d.

The arrangement shown in FIGS. 1 and 2 provides only for movement in one direction. A second embodiment of the invention, shown in FIGS. 3-6, is more versatile and permits four modes of operation: (1) the load can be advanced clockwise with each index; (2) the load can be advanced counterclockwise with each index; (3) the load can be oscillated clockwise and counterclockwise with no net change of position; and (4) the load can be caused to remain stationary while the drive assembly reciprocates. In the two embodiments, like reference numerals denote corresponding elements.

Figure 3:
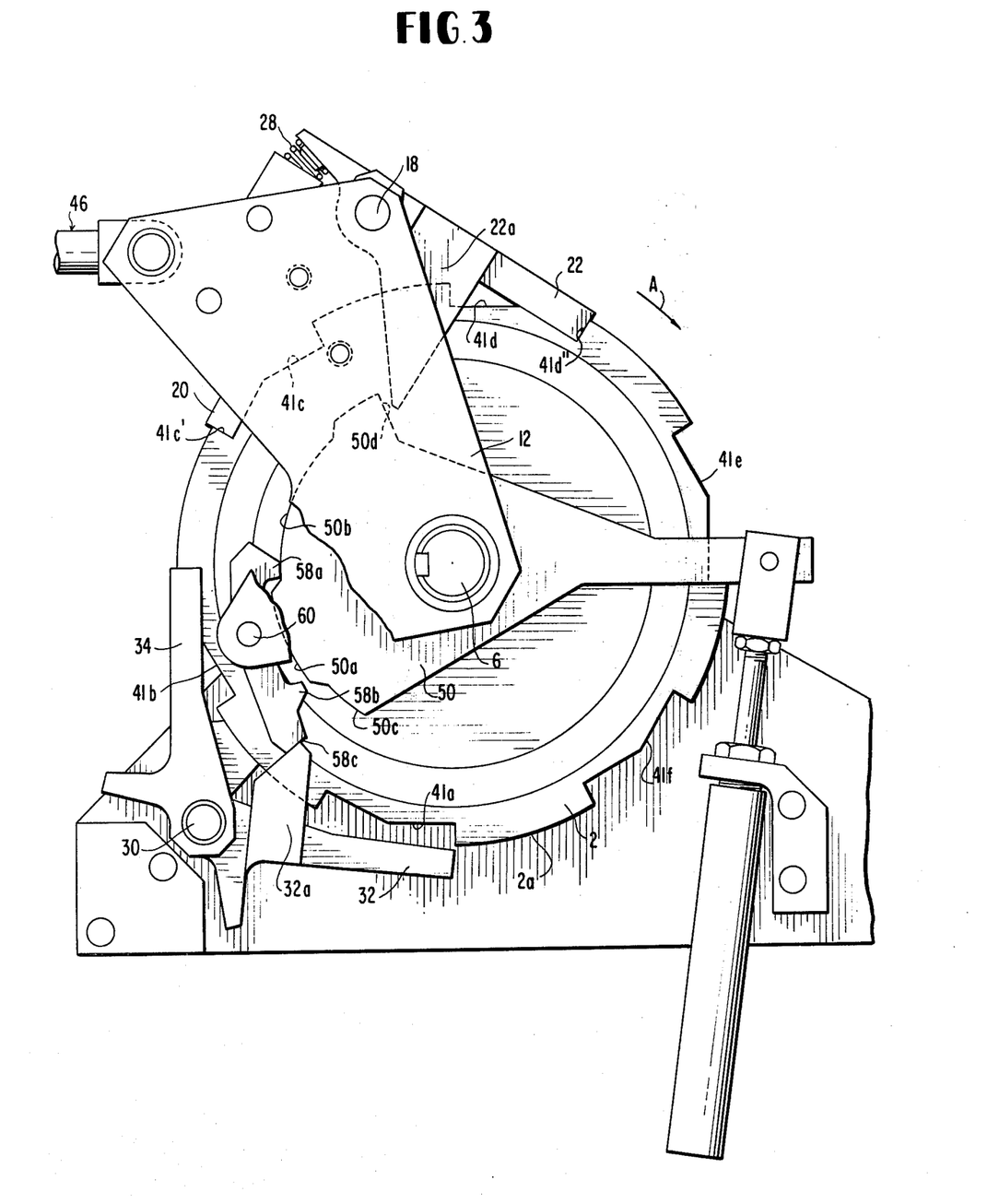
FIGS. 3 and 4 show opposite side sections of a second embodiment of the ratchet indexer in the pre-power stroke position.
Figure 5:
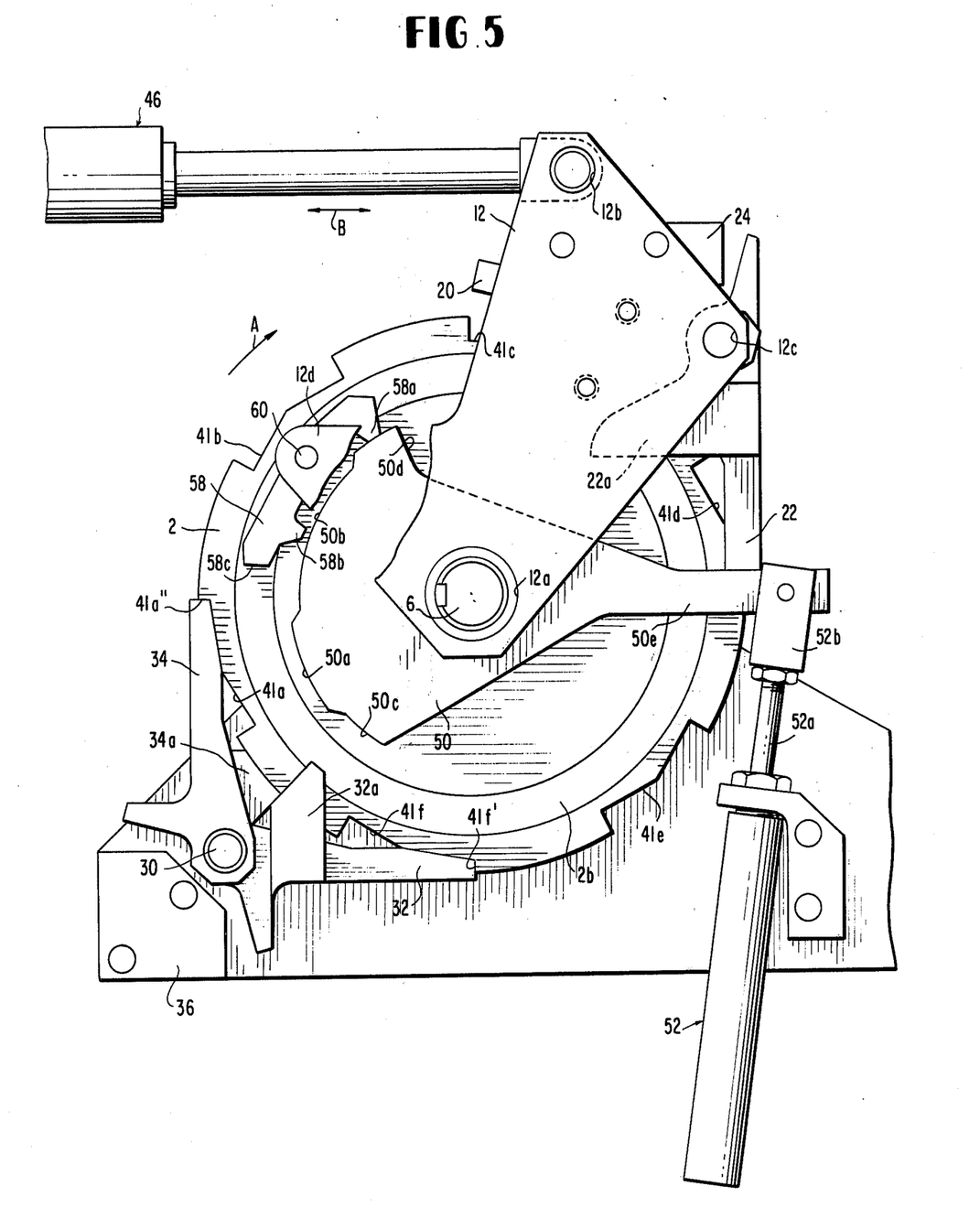
FIGS. 5 and 6 show corresponding side sections to FIGS. 3 and 4, respectively, of the second embodiment at the end of the power stroke.

In the second embodiment, a first cam member 50, as shown in FIGS. 3 and 5, is located between wheel 2 and bracket 12 and is supported on shaft 6 to permit relative freedom of rotational movement between cam member 50 and shaft 6. Cam member 50 has a land 50a separating a pair of grooves 50b and 50c. Cam member 50 has a further cam face 50d which cooperates with a leg 22a of pawl 22. In the position shown in FIG. 3, cam face 50d is spaced an arcuate distance greater than 60° from the end of leg 22a so that cam face 50d will not engage leg 22a in the forward mode of operation shown in FIG. 3.

Cam member 50 is provided with an extension arm 50 which is connected to the piston rod 52a of a first mode selection or control piston assembly 52, through a bracket assembly 52b that translates the axial movement of piston rod 52a into rotational movement of cam member 50.

A second cam member 54 (FIG. 4) is rotatably supported on shaft 6 between wheel 2 and bracket 14. Cam member 54 has a pair of grooves 54a and 54b separated by a land 54c. Cam member 54 has a further cam face 54d which cooperates with an arm 20a of pawl 20. Cam 54 also has an arm 54e extending substantially radially outward which connects with a U-shaped bracket 56b fixed to the end of a piston rod 56a of a second mode selection or control piston assembly 56. The connection between the bracket 56b and cam member 54 is such as to translate the axial motion of the piston 56a into rotational motion of the cam 54.

Figure 4:
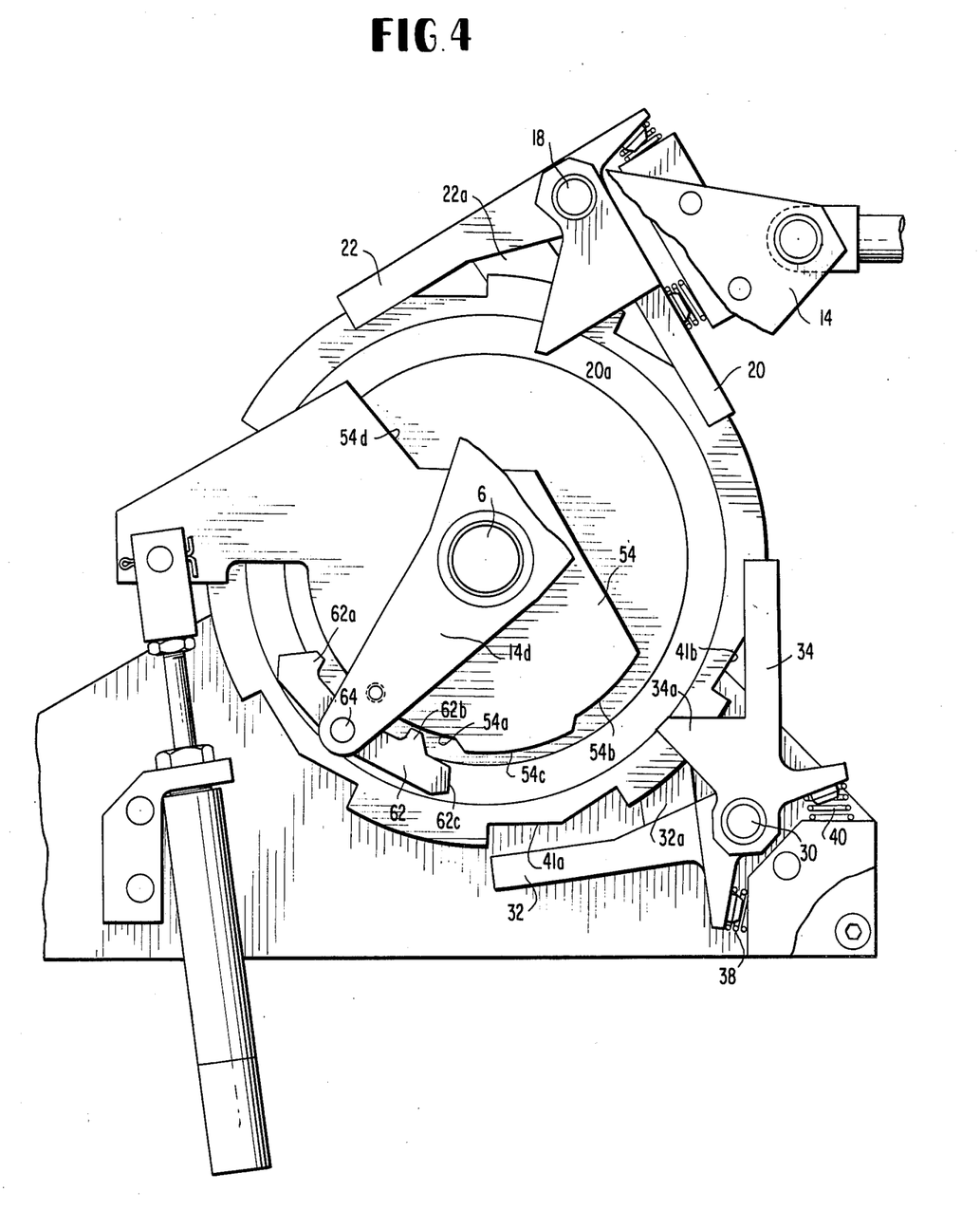

In the disclosed embodiment, the mode selection/control pistons 52 and 56 are fixed to base plates 8 and/or 10 in any known manner. Pistons 52 and 56 may be air operated pneumatic pistons which are spring loaded in opposite directions; thus, piston 52 is spring loaded in the extended direction (as shown in FIG. 3) and is driven by compressed air into its retracted position, whereas piston 56 is spring loaded in its retracted position and is driven by compressed air into its extended position (as shown in FIG. 4). The specific cam control mechanism described is exemplary only; it is readily apparent that many other devices could be used to control the movement of the first and second cam members 50 and 54, such as electromagnetic solenoid pistons, bi-directional fluid operated pistons, etc.

Bracket 12 includes an arm 12d which extends substantially radially outward from shaft 6 adjacent one face of wheel 2. A third cam member 58 (FIG. 3) is rotatably mounted on the end of arm 12d by means of for example, a pin 60. An annular groove 2b in wheel 2 receives the head of pin 60 to permit relative freedom of movement between wheel 2 and bracket 12. Cam member 58 has a pair of cam lobes 58a and 58b which cooperate with cam surfaces 50a–50d on cam member 50; a cam face 58c cooperates with a leg 32a of pawl 32, in a manner to be described in detail below.

A fourth cam member 62 (FIG. 4), similar to cam member 58, is rotatably mounted on the end of arm 14d by means of, for example, a pin 64. An annular groove 2c, corresponding to the opposite side of annular groove 2b, receives the head of pin 64 to permit relative freedom of movement between cam member 62 and wheel 2. Cam member 62 has cam lobes 62a and 62b which cooperate with cam surfaces 54a–54c of cam 54 to control the position of a cam face 62c which in turn cooperates with leg 34a of pawl 34, in a manner to be described in detail below.

The operation of this embodiment will be described below. For convenience, rotational movement of the wheel 2 and its fixed shaft 6 in the direction of arrows A will be assumed as the forward direction; conversely, rotational movement of the wheel 2 and its fixed shaft 6 in a direction opposite arrows A will be assumed as the reverse direction. The following chart shows the relationship between the mode selection/control assembly and the wheel and shaft motion.

| MODE SELECTION/CONTROL | | |
|---|---|---|
| Piston 52 | Piston 56 | Wheel/Shaft Motion |
| Extended | Extended | Forward |
| Retracted | Retracted | Reverse |
| Extended | Retracted | Oscillatory |
| Retracted | Extended | Locked |

FIG. 3 shows the indexer at the start of the power stroke for rotation in the forward direction. Cam lobe 58b of cam member 58 rides on land 50a of cam 50; this brings cam surface 58c into engagement with leg 32a of pawl 32 to cause rotation of pawl 32 about its pivot axis 30 against the biasing force of spring 38. Pawl 32 is therefore disengaged from groove 41a of wheel 2. Pawls 20 and 22 are spring loaded against the gear wheel 2 to engage adjacent grooves 41c and 41d, respectively.

Master drive piston 46 produces a reciprocating axial movement in the directions indicated by arrow B. On its power or drive stroke, piston 46 imparts a rotational motion to brackets 12 and 14 and pawls 20 and 22 about a pivot axis coincident with shaft 6. This causes pawl 22 to bear against sidewall 41d" to in turn produce a rotational motion of wheel 2 and shaft 6 in the direction of arrow A. As bracket 12 rotates, cam surface 58c releases pawl 32, which rotates (in a counterclockwise direction in FIG. 3) about its pivot axis (bolt 30). However, since wheel 2 has begun its rotation, pawl 32 does not drop into groove 41a, but rides on wheel surface 2a.

As the amount of wheel rotation approches 60°, pawl 32 is spring loaded into groove 41f where it contacts groove wall 41f to provide a positive stop against further rotation of the wheel. The power stroke termination position is shown in FIGS. 5 and 6.

Figure 6:
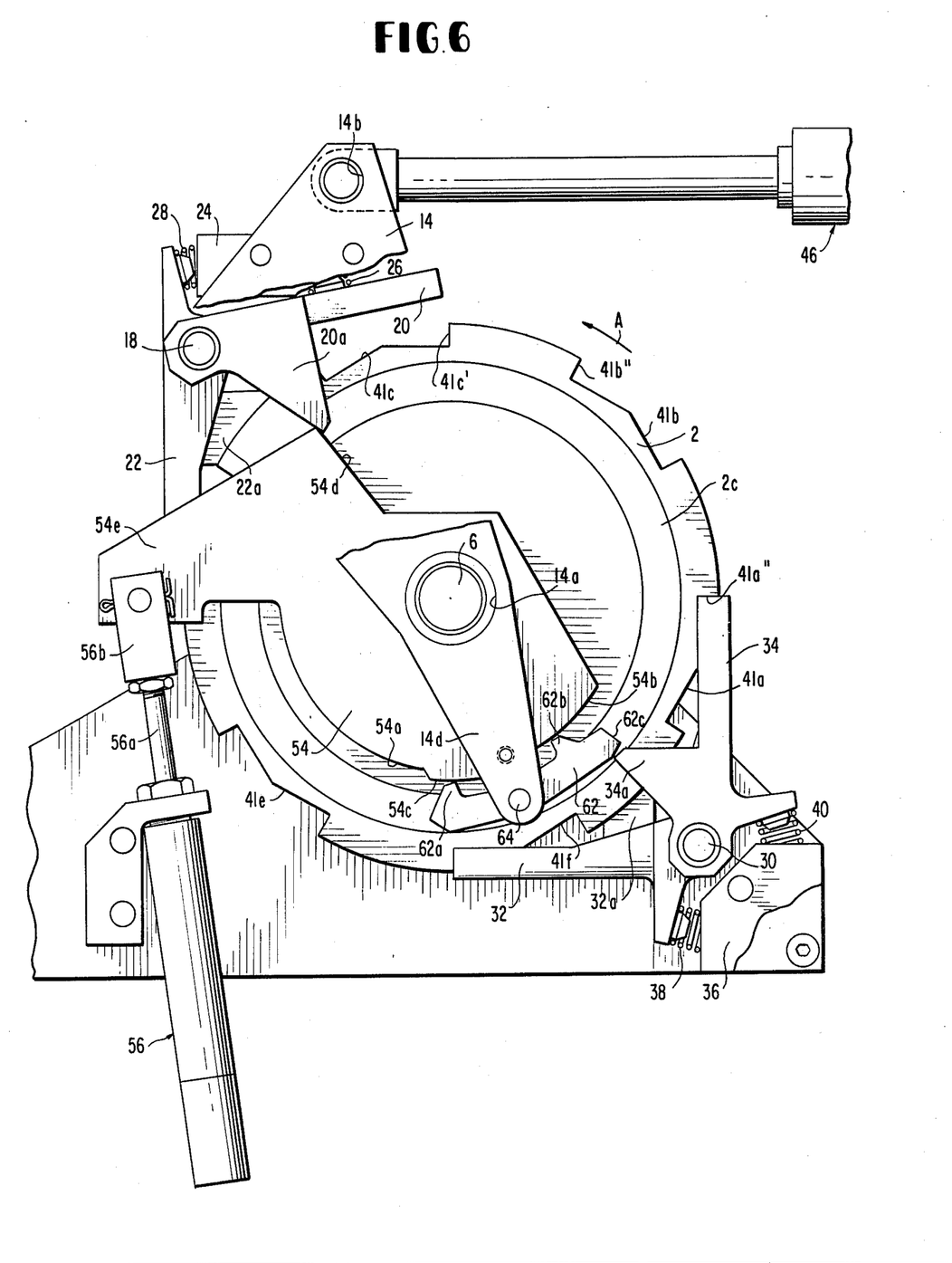

Referring particularly to FIG. 6, it will be seen that at the end of the power stroke, arm 20a of pawl 20 contacts cam surface 54d, causing pawl 20 to rotate about its pivot axis (bolt 18) against the normal biasing force of spring 26 and out of engagement with groove 41c. This permits the brackets 12 and 14 and pawls 20 and 22 to be rotated back through 60° of rotation by reciprocation of the drive piston 46 to thereby return to their pre-power stroke positions. During the recovery stroke, reverse rotation of gear wheel 2 is prevented by the engagement of pawl 34 with end wall 41a" of groove 41a.

In the forward mode of operation, cam lobes 62a and 62b cooperate with cam surfaces 54a, 54b, and 54c to keep cam surface 62c from contacting pawl leg 34a. Pawl 34 thus prevents rotational movement of wheel 2 in the reverse direction when pawls 20 and 22 are returned to their pre-power stroke positions.

Reverse operation is achieved by causing piston rods 52a and 56a to retract; this produces a rotational movement of cam members 50 and 54, respectively; in the disclosed embodiment, this may be through an arc of approximately 10°-25°. Referring to FIG. 3, if cam member 50 is rotated clockwise by the retraction of piston assembly 52, cam lobe 58a will ride up on land 50a, and cam lobe 58b will ride down into groove 50c, thereby imparting a counterclockwise rotation to cam 58 about pivot axis 60. Cam surface 58c will therefore pass by pawl arm 32a without engaging it.

At the same time, cam surface 50d will contact pawl arm 22a to impart a rotational movement to pawl 22 about its pivot axis 18 out of groove 41d against the loading of spring 28.

The axial retracting movement of piston rod 56a is translated into a rotational movement (counterclockwise in FIG. 4) of cam member 62; in the disclosed embodiment this may be through an arc of about 10°-25°. In this position, cam lobe 62b rides up on land 54c. Cam surface 62c is thus brought into position to contact pawl arm 34a; this imparts a rotational movement to pawl 34 out of groove 41b against the loading of spring 40.

Operation in the reverse mode is similar to that in the forward mode except that the pre-power stroke and power stroke termination positions are opposite those shown in FIGS. 3-6.

The power stroke occurs as the piston rod 46a retracts into the cylinder of piston assembly 46. During the power stroke, brackets 12 and 14 and pawls 20 and 22 rotate in the direction opposite arrows A. Pawl 20 acts against end wall 41c' of gear wheel 2 to rotate the wheel during the power stroke. As bracket 14 is rotated, it releases cam member 62 from engagement with pawl arm 34a, which is thereby urged back into engagement with wheel 2 by spring 40. When pawl 34 has rotated far enough to engage wheel 2, groove 41a has rotated so that the pawl 34 will not fall back into groove 41a but will ride on the outer surface 2a of the wheel toward and into groove 41b.

At the end of the power stroke, gear wheel 2 has rotated 60°; pawl 34 drops into groove 41b and engages end wall 41b" to stop further rotation of the gear wheel. Also, as the end of the power stroke is reached, pawl arm 22a contacts cam surface 50d of cam member 50 to cause a rotation of pawl 22 about pivot axis 18 against the action of spring 28. This disengages pawl 22 from wheel 2 to permit the master drive piston assembly 46, indexer drive brackets 12 and 14 and pawls 20 and 22 to return through the recovery stroke to the initial or pre-power stroke position. During the recovery stroke, rotation of gear wheel 2 in the forward direction (i.e. in the direction of arrows A) is prevented by the engagement of pawl 32 with end wall 41a' of groove 41a.

It is apparent that the oscillatory and locked modes can be achieved by imparting a rotational motion to only one of cams 50 and 54 to thereby alter the operating characteristics of cams 58 and 62 and cam surfaces 50d and 54d. This in turn affects the operation of pawls 20, 22, 32, and 34 to control the rotational movement of the wheel 2 and shaft 6.

While a specific embodiment of the invention has been shown and described in detail, it will be understood that the invention may be modified without departing from the spirit of the inventive principles as set forth in the hereafter appended claims.

What is claimed is:

1. An indexing mechanism comprising:
  base means,
  a gear wheel mounted to said base means for rotational movement in forward and reverse directions;
  drive means mounted adjacent said gear wheel for reciprocal movement independent of said gear wheel;
  first and second pawls mounted to said drive means for movement therewith, said first and second pawls being movable into and out of engagement with said gear wheel;
  third and fourth pawls mounted to said base means, said third and fourth pawls being movable into and out of engagement with said gear wheel;
  a first cam member mounted adjacent said gear wheel for movement independent of said gear wheel;
  a second cam member mounted adjacent said gear wheel for movement independent of the gear wheel; and
  mode selection means coupled to said first and second cam members for selectively moving each of said first and second cam members between respective first and second positions;
  wherein:
  in its first position, said first cam member controls movement of said third pawl relative to said gear wheel and, in its second position, the first cam member controls movement of said first pawl relative to said gear wheel; and wherein, in its first position, the second cam member controls movement of said second pawl relative to said gear wheel and, in its second position, the second cam member controls movement of said fourth pawl relative to said gear wheel; and
  wherein:
  when said first and second cam members are each in their respective first positions, said gear wheel is capable of being intermittently driven by said drive means only in a first rotational direction; and
  when said first and second cam members are each in their respective second positions, said gear wheel is capable of being intermittently driven by said drive means only in a second rotational direction opposite said first rotational direction.

2. An indexing mechanism according to claim 1, wherein:
  when said first cam member is in its first position and said second cam member is in its second position, said gear wheel is capable only of oscillatory movement in said first and second rotational directions.

3. An indexing mechanism according to claim 2, wherein:
  when said first cam member is in its second position and said second cam member is in its first position, said gear wheel is locked against movement in either of said first and second rotational directions.

4. An indexing mechanism according to claim 1, wherein:
  when said first cam member is in its second position and said second cam member is in its first position, said gear wheel is locked against movement in either of said first and second rotational directions.

5. An indexing mechanism according to claim 1, further comprising:
   means mounting said first and second pawls to said drive means for independent pivotal movement relative to each other about a common pivot axis;
   said first pawl and first cam member having respective cam surfaces thereon which engage each other only when said first cam member is in its second position and said drive means reaches the end of its stroke in one direction to pivot said first pawl out of engagement with said gear wheel; and
   said second pawl and second cam member having respective cam surfaces which engage each other only when said second cam member is in its first position and said drive means reaches the end of its stroke in an opposite direction to pivot said first pawl out of engagement with said gear wheel.

6. An indexing mechanism according to claim 5, said first cam member having a further cam surface and said third pawl having a cooperating cam surface; said mechanism further comprising:
   a third cam member cooperating with said further cam surface of said first cam member to engage the cam surface of said third pawl only when said first can member is in its first position to pivot said third pawl out of engagement with said gear wheel.

7. An indexing mechanism according to claim 6, wherein:
   said drive means comprises at least one bracket rotatably mounted adjacent said gear wheel and having a common axis of rotation therewith; and
   said third cam member is movably mounted on a radially extending arm of said bracket, said third cam member being rotatably movable with said bracket and pivotably movable about its own pivot axis under the guidance of the further cam surface of said first cam member.

8. An indexing mechanism according to claim 6, said second cam member having a further cam surface and said fourth pawl having a cooperating cam surface; said mechanism further comprising:
   a fourth cam member cooperating with said further cam surface of said second cam member to engage the cam surface of said fourth pawl only when said second cam member is in its second position to pivot said fourth pawl out of engagement with said gear wheel.

9. An indexing mechanism according to claim 8, wherein:
   said drive means comprises first and second brackets rotatably mounted on opposite sides of said gear wheel; and
   said third cam member is movably mounted on a radially extending arm of said first bracket, said third cam member being rotatably visible with said first bracket and pivotably movable about its own pivot axis under the guidance of the further cam surface of said first cam member.

10. An indexing mechanism according to claim 9, wherein:
    said fourth cam member is movably mounted on a radially extending arm of said second bracket, said fourth cam member being rotatably movable with said second bracket and pivotably movable about its own pivot axis under the guidance of the further cam surface of said second cam member.

11. An indexing mechanism according to claim 5, said second cam member having a further cam surface and said fourth pawl having a cooperating cam surface; said mechanism further comprising:
    a fourth cam member cooperating with said further cam surface of said second cam member to engage the cam surface of said fourth pawl only when said second cam member is in its second position to pivot said fourth pawl out of engagement with said gear wheel.

12. An indexing mechanism according to claim 11, wherein:
    said drive means comprises at least one bracket rotatably mounted adjacent said gear wheel; and
    said fourth cam member is movably mounted on one radially extending arm of said bracket, said fourth cam member being rotatably movable with said bracket and pivotably movable about its own pivot axis under the guidance of the further cam surface of said second cam member.

* * * * *

UNITED STATES PATENT AND TRADEMARK OFFICE
CERTIFICATE OF CORRECTION

PATENT NO. : 4,165,656
DATED : August 28, 1979
INVENTOR(S) : Edward T. Rude

It is certified that error appears in the above–identified patent and that said Letters Patent are hereby corrected as shown below:

Column 6, line 45, "palws" should read --pawls--.
Column 6, line 54, "approches" should read --approaches--.
Column 9, line 27, "can" should read --cam--.
Column 10, line 12, "visible" should read --movable--.

Signed and Sealed this

Fifth Day of February 1980

[SEAL]

Attest:

SIDNEY A. DIAMOND

Attesting Officer

Commissioner of Patents and Trademarks